Sept. 23, 1924.  1,509,212
H. S. KEIGHTLEY ET AL
TURNTABLE LIFTING JACK GENERALLY FOR MOTOR ROAD VEHICLES AND THE LIKE
Filed May 7, 1923   3 Sheets-Sheet 1

INVENTORS
HENRY S. KEIGHTLEY,
GEORGE A. GODFREY,
BY Bright & Bailey
Attys.

Sept. 23, 1924.  1,509,212
H. S. KEIGHTLEY ET AL
TURNTABLE LIFTING JACK GENERALLY FOR MOTOR ROAD VEHICLES AND THE LIKE
Filed May 7, 1923  3 Sheets-Sheet 3

INVENTORS
HENRY S. KEIGHTLEY,
GEORGE A. GODFREY,
BY Bright Bailey
ATTYS.

Patented Sept. 23, 1924.

1,509,212

UNITED STATES PATENT OFFICE.

HENRY STUART KEIGHTLEY AND GEORGE ARTHUR GODFREY, OF NEWCASTLE-ON-TYNE, ENGLAND.

TURNTABLE LIFTING JACK GENERALLY FOR MOTOR ROAD VEHICLES AND THE LIKE.

Application filed May 7, 1923. Serial No. 637,215.

*To all whom it may concern:*

Be it known that we, HENRY STUART KEIGHTLEY and GEORGE ARTHUR GODFREY, subjects of the King of Great Britain, residing at E. Milburn House, Newcastle-on-Tyne, have invented new and useful Improvements in Turntable Lifting Jacks Generally for Motor Road Vehicles and the like; and we do hereby declare the following to be a full, clear, and exact description of the invention, such as will enable others skilled in the art to which it appertains to make and use the same.

This invention relates to improvements in lifting jacks, generally for vehicles, motor and the like, and has for its object to provide a convenient and readily accessible appliance, capable either of being carried in a position ready for immedate use and for lifting the vehicle platform stage or such similar suitable body to which it may be attached, bodily off the ground, or as a portable device capable of achieving the same results, which may be readily and conveniently moved from place to place.

A further object of this invention is to enable the vehicle, platform stage or such similar suitable body to be turned completely in a horizontal plane with a small amount of effort. A lifting jack according to the present invention, comprises a body part from a portion of which radiate arms adapted to be connected to the frame or axles of a vehicle, platform stage or such similar suitable body, preferably but not necessarily employing legs adapted to be engaged with the ground and connected to another portion of said body part, and means for moving said former portion vertically relative to the said latter portion. According to an embodiment of our invention the said arms may be rotated in a horizontal plane whereby the vehicle, platform stage or such similar suitable body, when clear of the ground may be turned in a horizontal plane.

In order that our invention may be clearly understood and readily carried into effect, an embodiment of same is described hereafter by the aid of the accompanying sheets of drawings and for the purpose of easy illustration only, the invention is shown as a fixed component to an ordinary motor vehicle wherein:—

Fig. 5 is a detail view of one of the feet for the legs, and

Fig. 6 is a detail view illustrating the application of the dual, safety and antitheft attachment.

Figure 1:
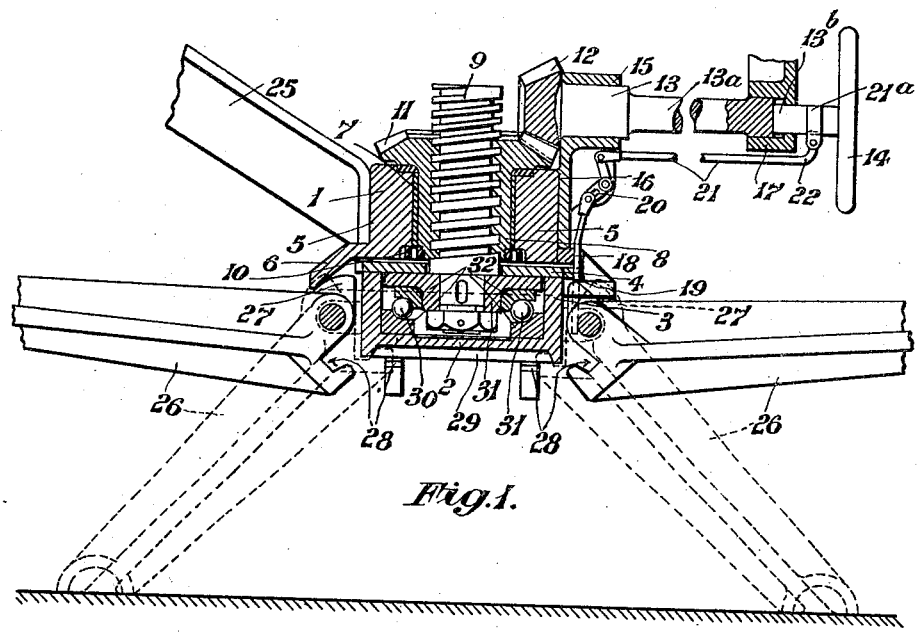
Fig. 1 is a sectional side elevational view.
Figure 2:
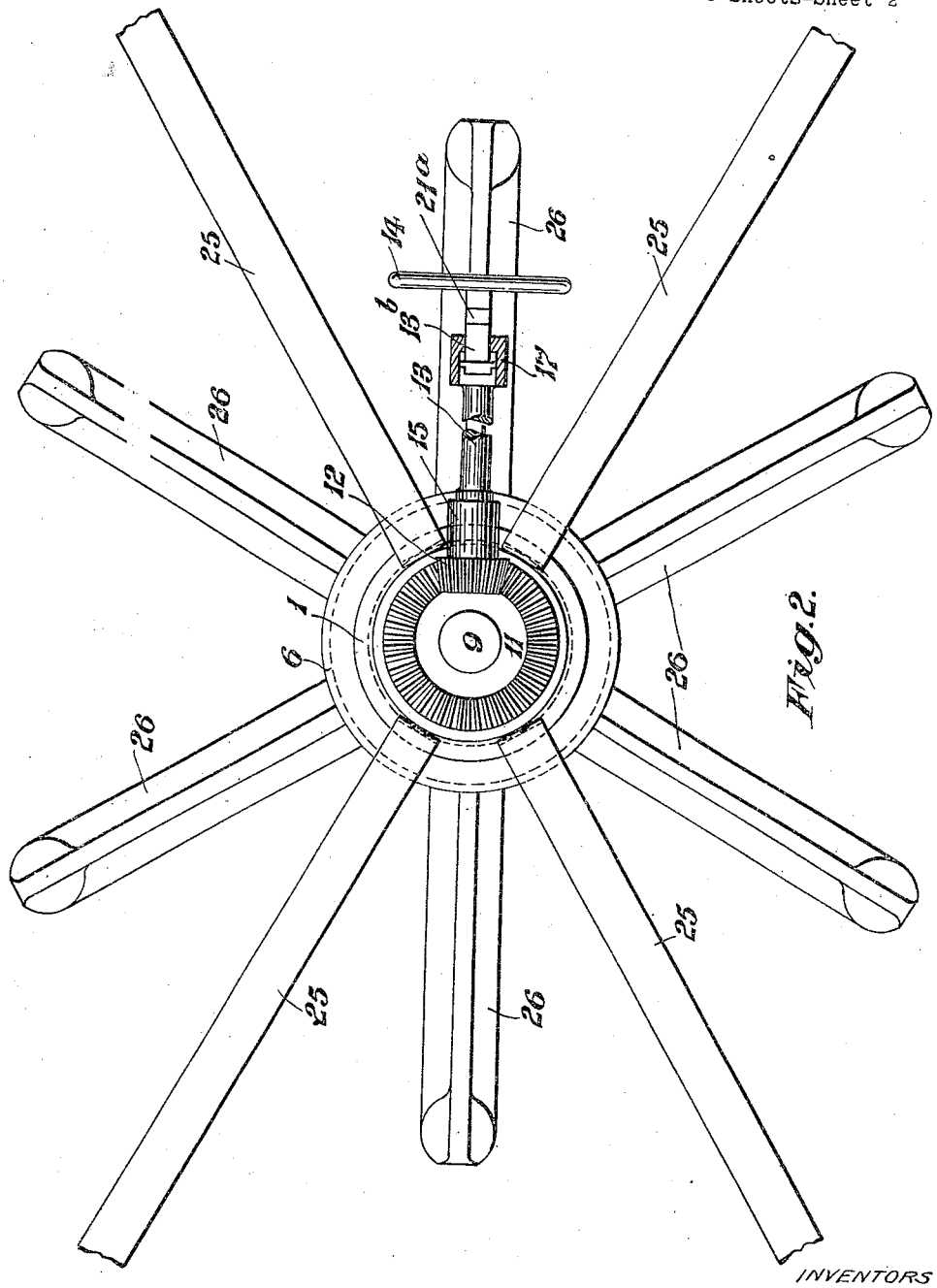
Fig. 2 is a plan view.
Figure 3:
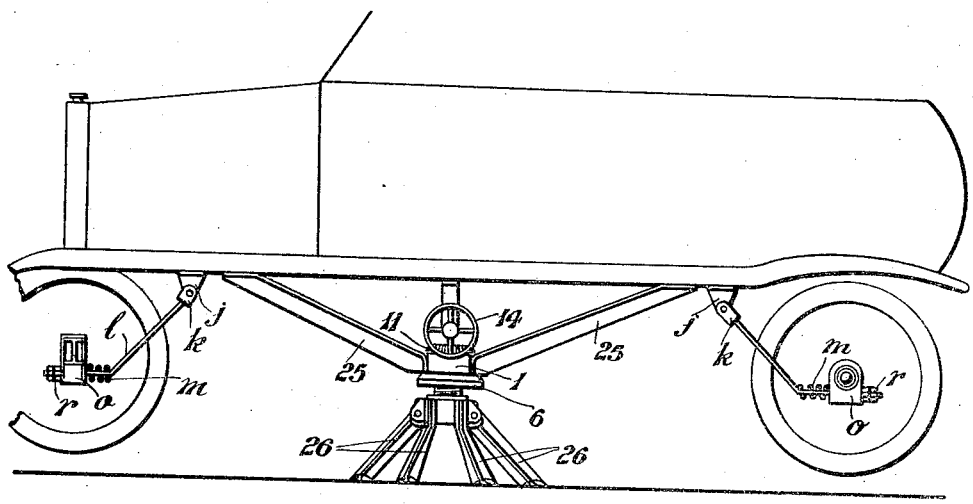
Figs. 3 and 4 are side elevation and inverted plan views respectively, illustrating the preferred disposition of the appliance.
Figure 4:
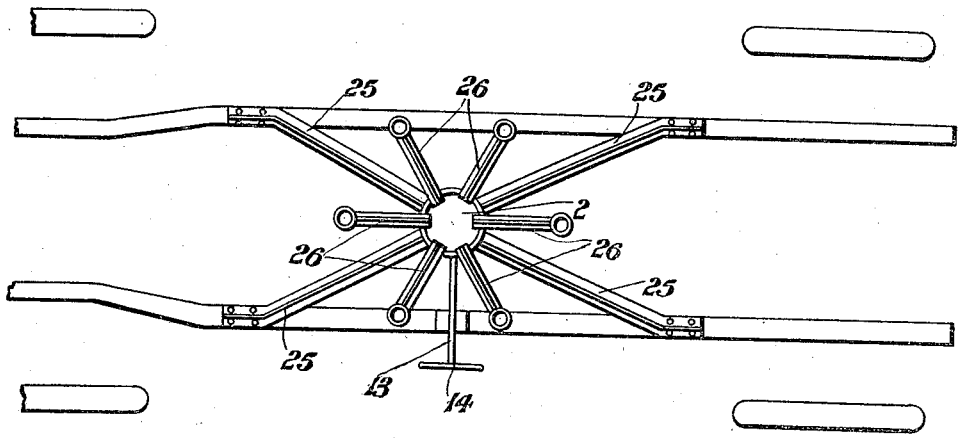

Referring to the drawings, the body part of the jack comprises two relatively movable parts upper and lower, 1 and 2 respectively. The lower part 2 comprises a shallow cylindrical housing 3 having a cover plate 4 fixedly secured thereto, whilst the upper portion 1 comprises a collar 5, the base of which constitutes a truncated conical flanged portion 6 the purpose of which will hereinafter be apparent. The collar 5 is provided concentrically with a bush 7 which provides a bearing for a rotatable elevating nut 8 threaded on to a normally non-rotating elevating screw 9. The base of the elevating nut 8 has threaded on to it an annular locking ring or nut 10 which prevent relative axial movement of the said nut 8 relatively to the collar 5. The elevating nut 8 is provided on its upper face with a toothed wheel 11 which is meshed by a pinion 12 carried at the inner end of the shaft 13 of an elevating handwheel 14, such shaft 13 being supported at its inner end in a bearing 15 carried by a bracket 16 secured to or formed integrally with the collar 5, whilst such shaft is supported adjacent its outer end by a bracket 17 secured to the frame of the vehicle.

The upper part 1 is normally prevented from rotating relatively to the lower part 2 by means of a vertical locking pin 18 which passes slidably through the truncated conical portion 6 and engages one of a plurality of short radial slots 19 formed in the periphery of the coverplate 4. The upper end of this pin 18 carries a bifurcated portion having a pin and slot connection with a cranked lever 20 the upper end of which is pivotally connected to the bifurcated inner end of a horizontal slidable rod 21 passing below the bracket 17. The outer extremity of the rod 21 is cranked at 22 where it is connected to the shaft 13 by means of a collar 21ª, and the shaft 13 is divided into two parts, a main part 13ª, and a handwheel hub part 13ᵇ to which latter part the collar 21ª is rotatably attached.

The opposing ends of the parts 13ª and 13ᵇ are normally engaged by means of a dog formed on the end of one and engaging a recess formed in the end of the other, as clearly shown, and when it is desired to disengage the locking pin 18 all that it is necessary to do is to pull the hand wheel 14 outwards.

The upper portion 1 of the body part is adapted to be connected permanently or detachably with the chassis or underframe of the vehicle, and for this purpose radiating arms 25 are provided, secured at their inner ends to the collar 5 and adapted to be secured at their outer ends by bolts, clamps or other convenient means to a convenient part of the vehicle.

These arms are preferably, but not essentially, T-shaped in cross section for the purpose of strength and rigidity.

The axles carrying the wheels are lifted uniformly with the vehicle through the medium of four tie rods 1, one for each wheel. The upper end of each rod 1 is secured into a bifurcated end piece K which is connected to a lug J allowing pivotal action and which is fixed conveniently to the frame. The lower end of each rod 1 is turned under its associated axle and extended through a bracket o bolted to the axle, nuts r being threaded on the free ends of the rods to hold them in position and coil springs M being fitted over the turned under portions to take any road shocks in a manner which is obvious.

When the jack is in use, legs 26 are adapted to be engaged with the ground, such legs being pivotally connected at their inner ends to the housing 3, and normally maintained clear of the ground in a substantially horizontal position by being engaged with the inner face of the truncated conical portion 6, as clearly shown in Fig. 1, the inner ends of these legs being provided with ears or lugs 27 adapted to engage against such inner face.

These ears or lugs are so curved or otherwise conveniently shaped that when the parts 1 and 2 move away from each other the legs will move downwards about their pivots until slots 28 formed at their inner underneath ends engage over an annular rim 29 formed on the under face of the housing 3, the reverse action occurring when the parts 1 and 2 move towards each other.

It will be apparent by reference to Fig. 1 of the drawings, that by rotating the elevating nut 8, it will move in a vertical direction upon the screw 9 and will carry the collar 5 with it, so that when the legs engage the ground the device acts as a jack. Should it be desired to rotate the vehicle in a horizontal plane the locking pin 18 is lifted clear of the cover plate 4 by the apparatus provided for such purpose, and the upper part 1 can then be rotated axially relatively to the lower part. To facilitate the turning action, ball or roller bearings 30 are provided between a flanged boss 31 keyed to the elevating screw 9 and the base of the housing 3, annular bearings rings or races 32 being provided for engagement by the balls or rollers. The lower ends of the legs 26 are preferably provided with feet 33 as shown in Fig. 5 whereby a good gripping action is ensured, such feet each having a ball and socket connection with the base foot. Any convenient number of legs from three upwards may be provided, in order to ensure substantial support so that the vehicle will not easily tilt when being turned. It will be apparent that if desired the elevating nut may be rotated by mechanism extending through the floor of the vehicle in a vertical or similar manner, which would enable the operator to work the operating handwheel from inside the vehicle. It will be further apparent that the arms 25 will have a bracing effect upon the chassis or frame of the vehicle if they are permanently attached thereto.

Figure 6 shows a device forming a connection between the non-rotating elevating screw 9 and the change speed gate, of the gear box. By turning the operating handwheel 14, which lowers the elevating screw 9, the link E is pulled back just a sufficient distance only to force the duplicate change speed gate to go forward or backwards as convenient, through the medium of the lever f, fulcrumed at g, the distance necessary to entirely and effectively cover the slots or leads in which the change speed lever has to be directed in order to engage the gears necessary to start the vehicle. This action takes place immediately on turning the operating handwheel 14 and because of the peculiar shape of the slot in rocking lever b, it effectively locks the change speed lever in a neutral position with the smallest amount of travel necessary.

Where a ball change speed lever is used, the same principle for locking it in the neutral position applies.

Likewise before the gear lever is entirely free to be operated at will, the handwheel 14 must be fully brought back to starting position, thereby affording assurance to the operator that the legs 26 have been folded quite clear and the jack fully returned to "all clear position". It will be further obvious that this device constitutes also an anti-theft device it being necessary to completely restore the jack to the "all clear position" in order to be able to use the gear lever.

What we claim is:—

1. A lifting jack comprising a body portion composed of a pair of sections, means connecting said sections effective to separate them, means connecting one of said sections with a device to be lifted and suspending said body portion from such device, legs carried by the other section engageable with a support whereby separation of said sections results in lifting of the device with which the first section is connected, and means whereby said legs are automatically elevated above said support when said sections are moved towards one another.

2. A lifting jack comprising a body portion composed of a pair of sections, means connecting said sections effective to separate them, means connecting one of said sections with a device to be lifted and suspending said body portion from such device, legs carried by the other section normally held suspended with said body portion and adapted to be lowered into engagement with a support whereby separation of the sections results in lifting of said device, and means whereby said legs are automatically lowered into engagement with said support when said sections are separated.

3. A lifting jack comprising a body portion composed of a pair of sections movable towards and away from each other, means connecting one of said sections with a device to be lifted and suspending said body portion from such device, legs carried by the other section normally held suspended with said body portion and adapted to be lowered into engagement with a support whereby separation of said sections results in lifting of said device, and cam means whereby said legs are automatically lowered and raised when the sections of said body portion are separated and moved together, respectively.

4. A lifting jack comprising a body portion composed of a pair of sections connected for movement towards and away from one another, means connecting one of said sections with a device to be lifted and suspending said body portion from such device, legs pivoted to the other section, cam means on said legs, and cam means on said first mentioned section cooperating with the cam means on said legs to swing the latter upon their pivots and hold them suspended with the body portion when the sections are moved towards one another and to lower them into engagement with a support when the sections are separated.

5. A lifting jack comprising a body portion composed of a pair of sections rotatable with respect to each other and also movable towards and away from one another, a connection between said sections for moving them towards and away from one another, an operator rotatable to actuate said connection, a portion of said operator having another movement and means operating between said sections to deny and permit relative rotation thereof, said means being actuated by movements of the last named portion of said operator.

6. The combination with a vehicle including a gear shift control device having a neutral position; of a jack carried by said vehicle for lifting the latter, and means between said jack and said gear shift control device operating to hold the latter in neutral position when the vehicle is raised by said jack.

7. The combination with a vehicle including a gear shift control device having a neutral position; of a jack carried by said vehicle for lifting the latter, and means between said jack and said control device operating automatically when the jack is actuated to lift the vehicle to move said device to neutral position.

In witness whereof we have signed this specification in the presence of two witnesses.

HENRY STUART KEIGHTLEY.
GEORGE ARTHUR GODFREY.
Witnesses:
 ALBERT W. SCOTT,
 M. W. A. BORESMANN.